J. & W. O. SWINNERTON.
WIND-MILL.

No. 178,346.  Patented June 6, 1876.

Witnesses
Geo. H. Strong
John L. Bond

Inventor
William O. Swinnerton
James Swinnerton
by Dewey & Co.
Att'ys

UNITED STATES PATENT OFFICE.

JAMES SWINNERTON AND WILLIAM O. SWINNERTON, OF OAKLAND, CAL.

IMPROVEMENT IN WINDMILLS.

Specification forming part of Letters Patent No. 178,346, dated June 6, 1876; application filed February 29, 1876.

*To all whom it may concern:*

Be it known that we, JAMES SWINNERTON and WILLIAM O. SWINNERTON, of Oakland, Alameda county, State of California, have invented an Improved Windmill; and we do hereby declare the following description and accompanying drawings are sufficient to enable any person skilled in the art or science to which it most nearly appertains to make and use our said invention or improvement without further invention or experiment.

Figure 1:
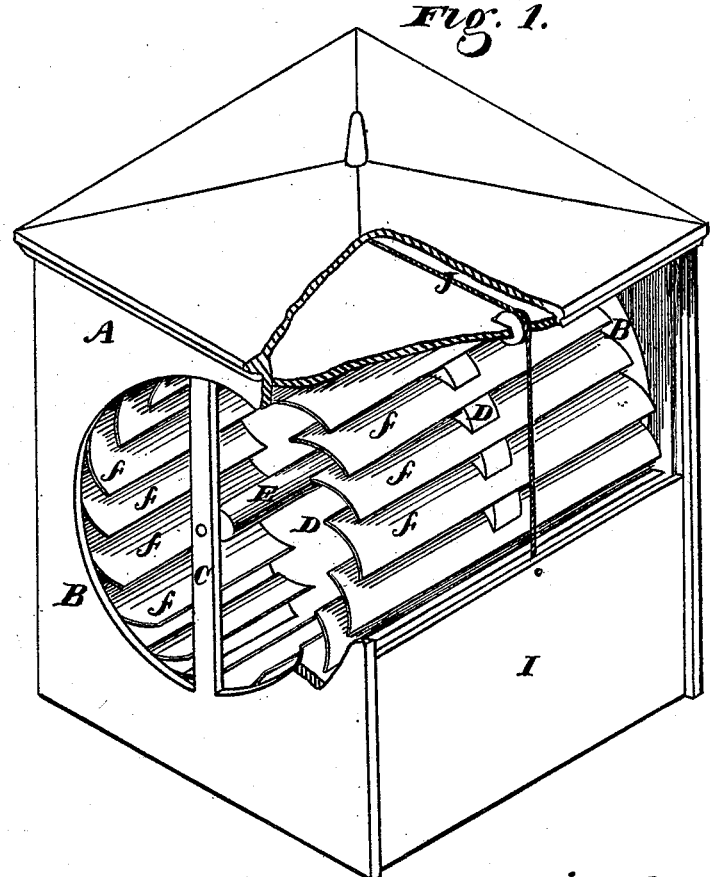
Figure 2:
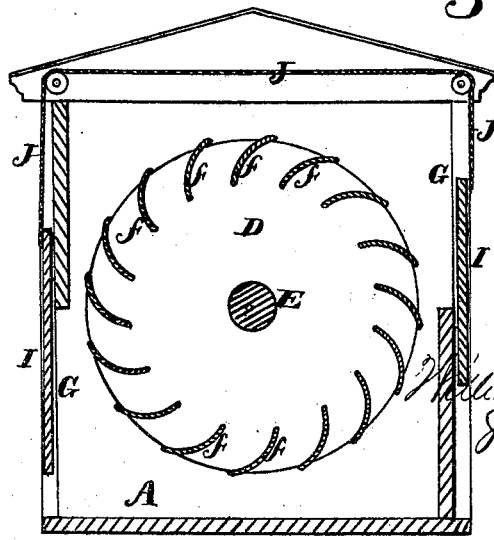

Our invention relates to an improved windmill; and it consists in mounting the windmill on a horizontal axis inside of a fixed case or housing, which has openings in its sides, suitably arranged to admit the wind to the wheel, and in which the wind-openings are regulated by slides, which can be adjusted to admit more or less wind, as desired Referring to the accompanying drawings, Figure 1 is a perspective view of our mill, with a part broken away to show the interior. Fig. 2 is a transverse section.

Let A represent a box or housing, which can be mounted upon the top of any suitable base or pedestal. In two opposite sides of this housing or case we make a circular opening, B, and across the middle of each of these openings we secure a strong beam or timber, C.

The wind-wheel consists of a disk, D, which is secured upon the middle of a shaft, E, said shaft passing through the center of the disk, and extending across the box or housing, so that its ends will have a bearing in the middle of the beams or timber C. This disk is slightly larger in diameter than the diameter of the side openings B.

The wings or blades $f f$ of the wheel are secured to the rim or circumference of the disk or disks at a short distance apart, so that they extend entirely across the case or housing.

If desired, two or more disks could be used; but one is sufficient, the object being to construct a horizontal wheel, the blades or wings of which extend entirely across inside of the case in one direction, while its ends are open to receive the force of the wind which enters through the openings B.

In each of the opposite or alternate sides of the case or housing A we make an opening, G, which extends entirely across the case. On one side this opening is made at the top of the case, and on the opposite side at the bottom—that is, the upper half of one side is open, while the lower half of the opposite side is open.

A gate or door, I, is arranged to slide up and down in the projecting edge of the case or housing on each side, and these gates or slides are connected together by a cord, $j$, which passes through the upper part of the housing and over pulleys, so that the slides balance each other, and when one is moved upward to close the upper opening on one side the opposite slide moves downward, and closes the opening on the opposite side correspondingly.

The slides can be operated by hand, or a governor can be applied that will operate them automatically.

When these slides are open the wind will pass through the openings in the upper side of the case and act directly upon the wings or blades of the wheel, and by partly closing the openings the speed of the wheel can be regulated. The wind will also act upon the bucket of the wheel to rotate it when it blows through either of the end openings B, if the slides are drawn away from over the side openings; but when the slides are closed over the side openings the wind which enters the end openings will have no effect to rotate the wheel. In other words, a current must be produced through the case across the wheel before the wheel will rotate, and when the side openings are left open to any extent whatever, such a current is created, and the wheel will rotate with a corresponding velocity.

The shape of the buckets is immaterial so long as they stand at an angle to the central shaft; but we prefer to make them concavo-convex, as represented, and then set them at an angle to the shaft.

We thus provide an exceedingly cheap and simple windmill, which will be quite ornamental in appearance, and which will have greater power than the ordinary horizontal windmill, such as has heretofore been inclosed in a case or housing.

One or more cranks can be used to connect the shaft with the mechanism to be operated, and it can be applied at either one or both ends of the shaft; or the wheel can be so constructed as to allow the crank to be applied at the middle of the shaft.

Having thus described our invention, what we claim, and desire to secure by Letters Patent, is—

A wind-wheel consisting of one or more disks, D, having wings or blades $f f$ secured to their rims at right angles to said disk or disks, and mounted upon the horizontal shaft E, inside of a case or housing, A, said case or housing having the end openings B and alternate side openings G, the latter openings arranged to be closed or opened simultaneously by means of the balanced slides L L, all combined and arranged to operate substantially as and for the purpose above described.

In witness whereof we hereunto set our hands and seals.

JAS. SWINNERTON. [L. S.]
WILLIAM O. SWINNERTON. [L. S.]

Witnesses:
  GEO. H. STRONG,
  JOHN L. BOONE.